Figure 1:
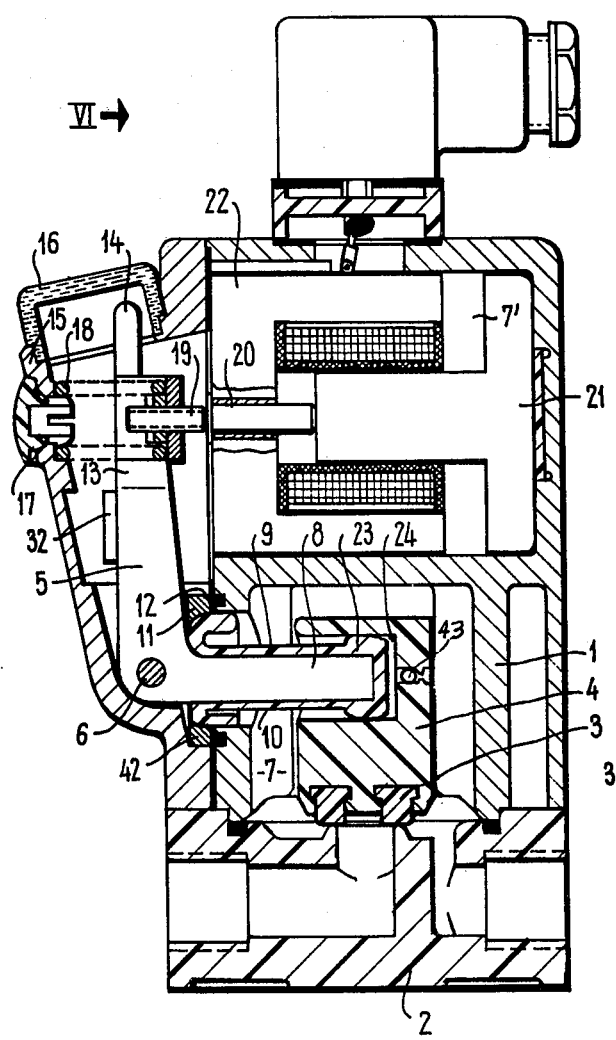

United States Patent [19]

Müller

[11] 4,027,849

[45] June 7, 1977

[54] VALVE FOR AGGRESSIVE FLUIDS

[76] Inventor: Fritz Müller, Beim Bahnhof, D 7119 Criesbach, Germany

[22] Filed: Mar. 31, 1975

[21] Appl. No.: 563,409

[30] Foreign Application Priority Data

Apr. 4, 1974  Germany .......................... 2416359

[52] U.S. Cl. .................................. 251/30; 74/18.1; 251/58; 251/138; 251/229; 251/235
[51] Int. Cl.² ......................................... F16K 31/10
[58] Field of Search ................ 74/18.1; 251/30, 58, 251/229, 235, 231, 138, 3

[56] References Cited

UNITED STATES PATENTS

| | | | |
|---|---|---|---|
| 1,301,948 | 4/1919 | Kaplan et al. ...................... 251/229 |
| 2,168,774 | 8/1939 | Hurlburt ............................. 251/229 |
| 2,310,130 | 2/1943 | Thumim et al. ...................... 251/30 |
| 2,334,834 | 11/1943 | Newell ................................. 251/58 |
| 2,449,790 | 9/1948 | Sebald ................................ 251/229 |
| 2,449,794 | 9/1948 | Steele, Jr. ........................... 74/18.1 |
| 2,511,844 | 6/1950 | Grove .................................. 251/58 |
| 2,969,087 | 1/1961 | Raney ................................. 251/30 |
| 3,563,099 | 2/1971 | Rader ................................. 74/18.1 |
| 3,727,630 | 4/1973 | McInnis .............................. 251/30 |

*Primary Examiner*—Martin P. Schwadron
*Assistant Examiner*—G. L. Walton
*Attorney, Agent, or Firm*—Craig and Antonelli

[57] ABSTRACT

A valve arrangement for aggressive fluids which includes plastic components with a closing member being mounted within the valve body for movement toward and away from a valve seat to control the flow of the fluid. A pivotally mounted two-armed lever is provided with one arm projecting through a movable seal and having at least a portion thereof accommodated within the closing member. The other arm of the lever is selectively acted upon by an actuating element so that the closing member is selectively displaced toward and away from the valve seat.

18 Claims, 6 Drawing Figures

VALVE FOR AGGRESSIVE FLUIDS

The present invention relates to a straight-way or multiple-way valve and, more particularly, to a valve for aggressive fluids consisting of plastic components including a valve body with inlet and outlet connections for the fluid to be controlled and a closing member or shutter, movable against a valve seat, connected to one arm of a two-armed lever which is swivel-mounted on an axle extending substantially parallel to the plane of the valve seat and whose one arm extends substantially parallel to the plane of the valve seat while an actuating element acts upon the other arm, said one arm projecting outward through a movable seal and said swivel axle being located near said seal.

Such valves, especially solenoid-operated valves of this type provided with a swivel-mounted armature whose one end projects through a bellow-type seal into the valve body have been known heretofore. The bellow-type seal separates the valve space from the drive space. The shutter is secured to the end of the lever-type armature. As the shutter is not guided it will not always seat accurately against a valve seat unless special measures are taken to this effect.

Another known valve has a valve disc hinged to one end of a swivel-mounted two-armed lever whose arm carrying the valve disc projects into the valve space through a gasket. A drive acts upon the other lever arm. The valve disc is provided with a pin which is guided in a central hole. However, this guidance cannot be accurate, but must afford considerable play since the end of the lever to which the valve disc is hinged performs an arcuate motion. Consequently, a tightly sealing fit on the valve seat can only be achieved by providing the valve disc with a thick, highly elastic facing which compensates for unavoidable misalignment. However, such elastic materials frequently will not resist the attack of the aggressive fluids to which they are exposed.

It is, therefore, an object of the present invention to provide a valve of the straight-way or multiple-way type which is simple in design and yet accurately maintains the position between the shutter and the valve seat.

In accordance with the invention, this object is accomplished by an arrangement wherein the shutter of a valve of the type described herein first above is guided perpendicularly to the plane of the valve seat and wherein the connection between the lever arm and the shutter is designed so that the swivel-motion of the arm results in a translatory motion of the shutter. Advantages of the valve in accordance with this invention reside in the fact that although a swivel-mounted lever is used to drive the shutter, the shutter can perform an accurately linear motion, guided with respect to the plane of the valve seat in such a manner that an accurate sealing fit is ensured. This permits a straight-way or multiple-way valve to be provided which is of a very simple design and thus can be manufactured at low cost and yet function dependably and which, in particular, may be composed of plastic components at least where it is exposed to the flowing, possibly aggressive, fluid.

A diaphragm might be used as shutter. To provide for guidance, the diaphragm would additionally have to be provided with a guide pin. The shutter preferred for embodiments of this invention is, therefore, a valve plunger guided in a longitudinal guide. This embodiment affords the additional advantage that the valve can also be designed as a servo-controlled valve in a very simple manner.

The connection of the driving lever arm with the valve plunger may take various different forms. According to one embodiment of the invention, the arm is connected to the valve plunger via a double hinge, permitting the arcuate motion of the arm to be transformed into a linear translatory motion of the valve plunger. Alternatively, the lever arm may be provided with a transverse pin guided in an elongated hole provided in the valve plunger transversely to the direction in which the plunger moves. According to another, particularly preferred embodiment, however, the arm can be displaced in a transverse recess of the valve plunger relative to the plunger and parallel to the plane of the valve seat. Thus, the arm, according to this embodiment of the invention, extends into a transverse hole in the substantially cylindrical valve plunger. As the valve plunger moves substantially tangential to the arcuate path of the arm end, comparatively small displacements of the arm in the transverse recess are sufficient to produce a comparatively large valve stroke.

A particularly preferred embodiment of the invention is one in which the swivel bearing of the lever is located on an extension of the longitudinal axis of the arm and in which the arm and the transverse recess in the valve plunger are aligned with each other in the closing position of the valve plunger. This has the advantage that pressure fluctuations within the valve housing, which exert a force of changing magnitude acting on the bearing of the lever, cannot result in any motion of the valve plunger tending to open the valve.

The two-armed lever may be a straight lever as employed for a valve of the type described herein first above. However, this entails a drawback inasmuch as the overall size of such a valve is comparatively large because the drive system is located beside the valve body, referred to the direction of flow of the fluid to be controlled. Thus, according to a particularly preferred embodiment of the invention, the two-armed lever takes the form of an angle lever or bell crank whose other arm extends substantially perpendicular to the plane of the valve seat. This embodiment has the advantage that the drive system may be disposed directly above the valve housing, i.e., within that region which would be reached by an extension of the valve plunger guide. This affords substantial practical and operational advantages because, on the one hand, the valve can be built very compact and, on the other hand, the valve can be easily designed so as to facilitate replacement of the drive system and conversion to different types of drive means.

The transverse recess in the valve plunger may take the form of a through-hole, for example. However, according to a preferred embodiment of the invention, the transverse recess in the valve plunger forms a space which is closed on all sides with the exception of an opening for the lever arm which is sealed and guided in the transverse recess of the valve plunger. Upon operation of the valve plunger, the volume of this space changes as a result of the movement of the lever arm in the trasverse recess. If this space is completely sealed and filled with a compressible fluid, any movement beyond an intermediate deadcenter position produces a spring action which assists in keeping the valve in its final position. Preferably, however, this space communicates with the exterior space via a throttle whose action produces a damping effect. In this arrangement, this space, like the space surrounding the valve plunger, may be filled with a liquid or gas, for example air. The possibility of utilizing the volume change of this space to produce a spring action or damping effect is one of the special merits of the valve designed in accordance with this invention.

A further advantage of the valve in accordance with this invention resides in the fact that it can easily be equipped for servo-control by means of a pilot valve. In an embodiment of this type, the one arm of the lever operates the shutter of a pilot valve guided for sliding displacement within the valve plunger which is provided with a pilot valve seat; in addition, the space between the valve plunger and the valve housing is divided by a ring-type sealing diaphragm secured in a tightly sealing arrangement to the valve plunger on the one hand and the valve housing on the other hand. By these very simple means a valve which is otherwise designed exactly like the valve described herein above can be equipped for servo-control through a pilot valve. Thus, valves having greatly differing characteristics may be constructed from substantially the same components except for the modified valve plunger and the diaphragm.

The diaphragm used may be any conventional type. However, a particularly preferred embodiment of the invention is one in which the edges of the diaphragm adjacent the valve plunger and the valve housing are reinforced to form a ring having a circular cross-section and in which this ring, which is toroidal in shape, is supported in conforming grooves of circular cross-section and held in such a manner that it may be swiveled about its axis. This embodiment has the advantage that the restrained edge portions of the diaphragm need not be heavily deformed when the diaphragm bulges under an unbalanced pressure from one side, such deformation being partially replaced by the swivel motion of the ring-shaped edge. The useful life of the diaphragm is thus substantially increased. An added advantage is the possibility of using a diaphragm made of a comparatively stiff material which will resist proportionately higher excess pressures, whereas prior to this invention it was necessary either to keep the differential pressure acting on the diaphragm comparatively low or to put up with a shorter life owing to the limited deformability of stiff diaphragms.

Apart from these operational advantages, the diaphragm designed in accordance with this invention and its restraint have the added advantage of being very easy to manufacture. This is due to the fact that according to preferred embodiments of the invention the diaphragm is produced in a mold, especially by injection molding methods, which in the region of the circular-section edges is formed by the valve body and the valve plunger respectively. Thus, the mold proper only defines the flat surfaces of the diaphragm while the edge portions are directly injected into the circular-section annular grooves in the valve body and the valve plunger which are inserted into the mold for this manufacturing process, thus saving a substantial part of the otherwise necessary assembly work.

To make sure that the ring-shaped diaphragm edges are free to swivel in their grooves without any sticking as a result of the manufacturing process, the grooves may be coated with a release agent, such as a thin film of silicone oil. Alternatively, the diaphragm may be made of a material such as tetrafluorethylene (known under the trade-name of "Teflon"), which will not combine with the material of the valve plunger nor the material of the valve housing. This latter solution is preferably adopted for embodiments of this invention.

A bellow-type seal is used to seal the valve housing against the outside where the lever arm operating the valve plunger enters the housing. This bellow-type seal must resist the pressure occurring in the valve housing. In preferred embodiments of the invention, the lever arm is provided with a calotte-shaped projection intermediate the lever swivel axle and the bellow-type seal which bears against this projection via an intermediate elastic member when yielding to internal excess pressure. This embodiment is selected whenever major pressures may occur inside the valve body against which the bellow-type seal must be supported.

Further details and developments of the present invention will become apparent from the following description of embodiments of this invention shown by way of example in the accompanying drawing in conjunction with the claims.

In the accompanying drawing

Figure 6:
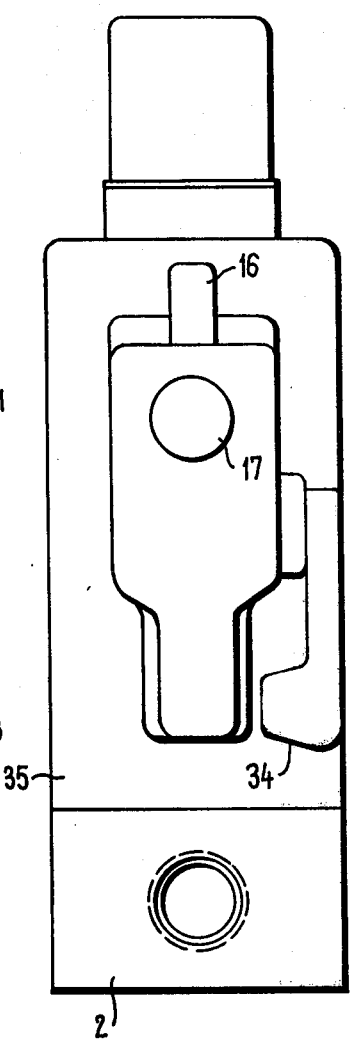
Figures 2, 3:
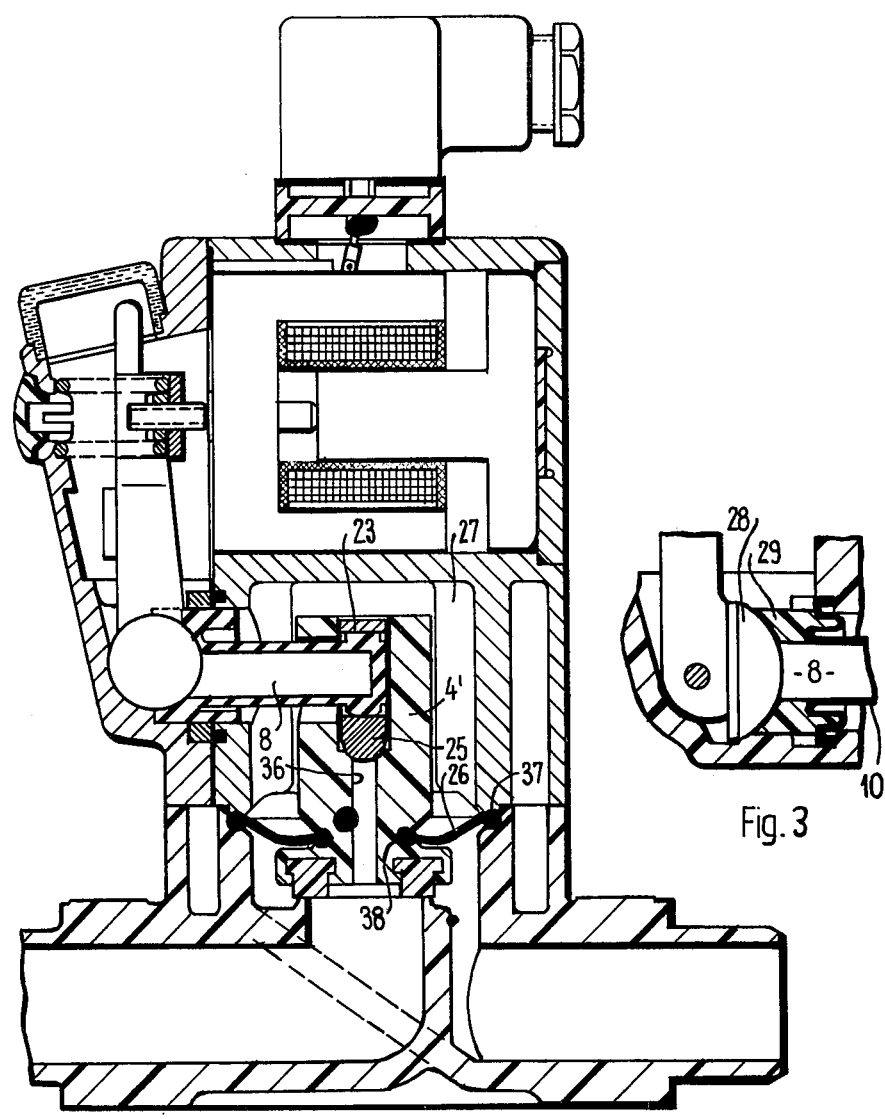
Figure 4:
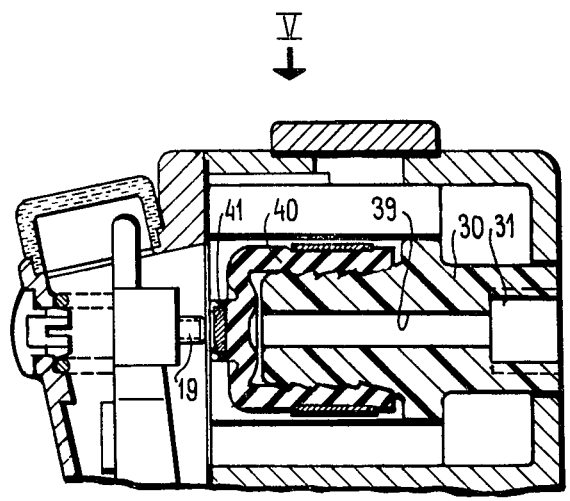
Figure 5:
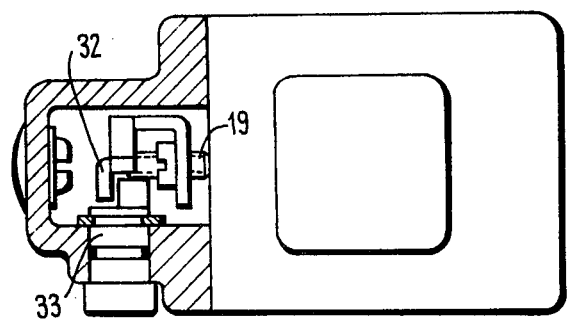

FIG. 1 is a section through a straight-way valve in accordance with the invention, FIG. 2 is a section through a straight-way valve with servo-control by means of a pilot valve, FIG. 3 is a section through the bearing of the angle lever, FIG. 4 is a section through a pneumatically or hydraulically controlled straight-way valve, FIG. 5 is a top view in the direction indicated by the arrow V of FIG. 4, partially cut away, and FIG. 6 is a side view in the direction indicated by the arrow VI of FIG. 1.

A valve housing 1 is assembled with a lower part 2 which contains the screw connections for the entry and exit of the fluid to be controlled. Both the valve housing 1 and the lower part 2 are made of plastic. In the valve housing 1, a valve plunger 4 provided with a sealing ring 3 inserted into said plunger at the end facing the lower part 2 is guided for longitudinal displacement. In the closed position of the valve, said sealing ring 3 bottoms against a valve seat forming an integral part of said lower part 2. An angle lever or bell crank 5 is swivel-mounted on an axle 6 disposed laterally adjacent the valve housing 1, said axle 6 being located substantially in the region of the outer surface of the valve housing 1, i.e., outside the valve space 7 defined by the valve housing 1. The lever arm 8 of the angle lever 5 extends into a transverse recess 9 of the valve plunger 4. The lever arm 8 carries an elastic sealing ring 23 fitted on a bellow-type seal 10 slid over the lever arm. Thus, the bellow-type seal 10 comprises a tubular section with a closed end surrounding the lever arm 8 and then expands into a diaphragm-type section with a rim 11 secured in the valve housing 1. In addition, a support 12 made of an elastic material conforming to the shape of the diaphragm portion of the bellow-type seal 10 is provided to support said diaphragm. The valve space 7, which may be entered by the aggressive fluid to be controlled, is sealed off toward the outside by said bellow-type seal 10.

The angle lever 5 has another lever arm 13 which extends substantially perpendicular to the plane of the valve seat and serves as drive arm, a drive system which produces a swivel motion of the angle lever 5 acting upon the end of said lever arm 13. The swivel motion of the lever arm 8 of the angle lever 5 is transformed into a translatory motion of the valve plunger 4 through the guidance of said valve plunger 4 and the sliding displacement of the lever arm 8 in the transverse recess of the valve plunger 4. One advantage of this arrangement is that any desired transmission ratio within a wide range can thus be obtained by simply selecting an appropriate lever arm ratio.

The extension of the valve housing 1 facing away from the valve space 7 encloses a space 7' which accommodates the drive units in a conveniently accessible position. As the lever arm 13 is disposed opposite this unit, an adjustable connection can be easily provided. The end of the lever arm 13 of the angle lever 5 carries a flag 14 or other indicator. The lever arm 13, together with the axle 6 and the flag 14, is covered by a housing or cap 15 provided with a window 16 of some transparent material in the region of the flag 14, thus providing a visual indication of the valve position. As an added advantage it is also possible to arrange switching contacts in this region for remote indication of the valve position. The cap 15 is provided with a cut-out covered by a further cap 17 on the outside. A resetting spring 18 bearing against a plate mounted on a setting pin 19 at its one end bears against the housing near said cap 17 at its other end. With the cap 17 removed, the setting pin 19, which is secured to the end of the lever arm 13, is accessible. The motion is transmitted to the angle lever 5 via the setting pin 19 which, in turn, is actuated by a pin 20 guided for axial movement. The pin 20 which is disposed in substantially axial alignment with the pin 19 is, in turn, displaced by a T-shaped armature 21 of an electromagnet 22. The stroke of the valve plunger 4 can be adjusted by adjusting the position of the setting pin 19.

The inner end of the transverse recess 9 is sealed off by the elastic sealing ring 23 and the lever arm 8. The resultant totally enclosed space 24 can be used as a damping chamber as the volume of this space changes with the swivel motion of the angle lever 5 and the stroking motion of the valve plunger 4. Throttle holes may be provided for communication between the said space and the surrounding valve space 7 and check valves may be installed in said throttle holes or, alternatively, check valves may be used instead of said throttles, thereby achieving a damping effect in both the opening and the closing direction or in one of these two directions only.

The embodiment of a valve in accordance with the invention depicted in FIG. 2 shows how easy it is to equip such a valve for servo-control by means of a pilot valve. For this purpose, the valve plunger 4' is provided with an axial longitudinal bore 36 which is enlarged at the end facing away from the lower part 2. The transition from the longitudinal bore 36 to the enlarged portion forms a valve seat on which seats a pilot valve shutter 25. This shutter 25 is provided with a transverse bore into which extends the lever arm 8 of the angle lever 5 which is guided and held in this transverse bore by means of the sealing ring 23. The shutter 25 may be lifted from, or bottomed on, its valve seat by swiveling the angle lever 5. In this embodiment, one edge 37 of a ring-type diaphragm 26 is restrained between the valve housing 1 and the lower part 2. The edge 37 is toroidal in shape, i.e., of circular cross-section. The inner edge of the diaphragm 26 is also provided with a reinforcement in the form of a circular-section ring 38. The annular grooves in the valve plunger 4' on the one hand and between the valve housing 1 and the lower part 2 on the other hand are also circular in cross-section so that the edges 37 and 38 can swivel about their (circular) longitudinal axes within the grooves in which they are held. This results in a sort of swivel joint between the diaphragm 26 and the valve housing 1 and lower part 2 on the one hand and the valve plunger 4' on the other hand which, nevertheless, permits the diaphragm to be restrained in a tightly sealing fit. As the edges of the diaphragm are not fixedly restrained, but free to swivel, the material used for the diaphragm may be comparatively stiff.

The sealing arrangement of the lever arm 8 shown in FIG. 3 affords increased resistance against internal excess pressure in the valve space 7. The lever arm 8 is provided with a calotte-shaped projection 28, and an intermediate member 29 with a certain degree of elasticity, conforming to the shape of the bellow-type seal 10 at the end facing said seal, bears against said calotte-shaped projection.

As shown in FIG. 4, the drive may also be provided by a pressure fluid instead of an electromagnet. The various drive systems are very easy to interchange. For this purpose, an insert 30 with a tapped hole 31 for connection of a supply line is incorporated in the upper part of the valve housing 1. From the tapped hole 31, a longitudinal bore 39 extends through the insert 30. A cup-shaped bellow-type seal 40 of some rubber-elastic material is secured to the end of the longitudinal bore facing away from the tapped hole 31. This bellow-type seal 40 tightly seals the mouth of the longitudinal bore 39. It carries a pressure platen 41 at its outer end, opposite the setting pin 19, which moves against the setting pin 19 to swivel the angle lever 5 when a pressure fluid is fed in through the tapped-hole connection 31, the pressure in the longitudinal bore 39 causing the bellow-type seal to bulge out and actuate the setting pin 19.

The angle lever 5 is provided with a bent projection 32 which is operatively engaged by a manual adjusting device 33 incorporating a hand lever 34 with a knob at the end. The angle lever can thus be blocked against operative movement or moved into the opening or closing position by shifting the hand lever 34.

The design of the angle lever and its location on the swivel axle 6 in the region of the lateral confines of the housing permit the cover cap 15 to be removed because neither the fluid to be controlled nor the drive fluid enter the space enclosed by this cap. It is thus possible to readjust the bellow-type seal 10, for example, by adjusting a ring 42.

What is claimed is:
1. A valve arrangement for aggressive fluids, the arrangement comprising: a plurality of plastic components including a valve body with inlet and outlet connections, a valve seat, means selectively movable toward and away from the valve seat for controlling a flow of the aggressive fluid, guide means for guiding the movement of said controlling means in a direction perpendicular to a valve seat plane, a two-armed lever means pivotally mounted on an axle extending substantially parallel to the plane of the valve seat, means provided in said controlling means for accommodating a first of said two-armed lever means, said first arm of said two-armed lever means extending substantially parallel to the plane of the valve seat, the other arm of said two-armed lever means extending substantially at a right angle to said first arm, an actuating means operatively associated with said other arm, a movable seal interposed between said other arm and said controlling means, the movable seal having an end portion terminating in proximity to the pivot axis of said two-armed lever means, said seal being fashioned as a diaphragm bellows having a hose-like extension adjoining a central area thereof with one of said extension being closed and with said extension extending over the length of said first arm and encompassing the same.

2. A valve arrangement as claimed in claim 1 wherein said controlling means includes a valve plunger and wherein said guide means guides said valve plunger for longitudinal displacement.

3. A valve arrangement as claimed in claim 2, wherein said accommodating means for said first arm includes a transverse recess provided in said valve plunger, said recess extending parallel to the plane of the valve seat.

4. A valve arrangement as claimed in claim 2, wherein a double hinge means is provided for connecting said first arm to said valve plunger.

5. A valve arrangement as claimed in claim 3, wherein the pivot axis of said two-armed lever means is located on an extension of the longitudinal axis of said first arm, and wherein said first arm and said transverse recess are aligned with each other in a closing position of said valve plunger.

6. A valve arrangement as claimed in claim 1, wherein said two-armed lever means is fashioned as one of an angle lever and bell crank.

7. A valve arrangement as claimed in claim 6, wherein said other arm of said two-armed lever means is provided with a cranked projection, and wherein an adjustable stop means is provided which is extendable into and retractable from the path of movement of said projection, said stop means being adjustable from the outside of said valve body.

8. A valve arrangement as claimed in claim 6, further comprising a valve housing and an operating mechanism disposed on the valve housing so that it can be removed for replacement in the direction of its operating movement and substantially perpendicular to said other arm of said two-armed lever means.

9. A valve arrangement for aggressive fluids, the arrangement comprising a plurality of plastic components including a valve body with inlet and outlet connections, a valve seat, a closing means selectively movable toward and away from the valve seat for controlling the flow of the fluid, a two-armed lever pivotally mounted on an axle extending substantially parallel to the plane of the valve seat, a first arm of said two-armed lever extending substantially parallel to the plane of the valve seat and being operatively connected with said closing means, an actuating means acting upon the other arm of said two-armed lever, said first arm projecting through a movable seal with the pivot axis of said two-armed lever being arranged in proximity to said seal, said closing means being guided perpendicularly to the plane of the valve seat with a connection between said first arm and said closing means being designed such that the pivotal motion of said first arm results in a translatory motion of said closing means, said two-armed lever means being formed as an angled lever with the other arm thereof extending substantially perpendicular to the plane of the valve seat, and wherein said actuating means includes a drive system, a pin means is provided for connecting said other arm with said drive system, said pin means bearing against said drive system, said pin means being adjustable from the outside so as to limit the stroke of said closing means.

10. A valve arrangement for aggressive fluids, the arrangement comprising a plurality of plastic components including a valve body with inlet and outlet connections, a valve seat, a closing means selectively movable toward and away from the valve seat for controlling the flow of the fluid, a two-armed lever pivotally mounted on an axle extending substantially parallel to the plane of the valve seat, a first arm of said two-armed lever extending substantially parallel to the plane of the valve seat and being operatively connected with said closing means, an actuating means acting upon the other arm of said two-armed lever, said first arm projecting through a movable seal with the pivot axis of said two-armed lever being arranged in proximity to said seal, said closing means being guided perpendicularly to the plane of the valve seat with a connection between said first arm and said closing means being designed such that the pivotal motion of said first arm results in a translatory motion of said closing means, said two-armed lever being formed as an angled lever with the other arm therof extending substantially perpendicular to the plane of the valve seat, a valve housing means is provided for housing the components, and wherein said other arm has an end portion which is at least partially located outside of the valve housing means, and wherein a cap means is provided for covering said end portion of said other arm, said cap means including a window at least in the area of the end portion of said other arm, and a flag is provided on said end portion of said other arm and is visible through said window means so as to serve as a position indicator.

11. A valve arrangement as claimed in claim 10, wherein manual adjusting means are provided on said cap means which project into the path movement of said other arm of said two-armed lever means.

12. A valve arrangement for aggressive fluids, the arrangement comprising a plurality of plastic components including a valve body with inlet and outlet connections, a valve seat, a closing means selectively movable toward and away from the valve seat for controlling the flow of the fluid, a two-armed lever pivotally mounted on an axle extending substantially parallel to the plane of the valve seat, a first arm of said two-armed lever extending substantially parallel to the plane of the valve seat and being operatively connected with said closing means, an actuating means acting upon the other arm of said two-armed lever, said first arm projecting through a movable seal with the pivot axis of said two-armed lever being arranged in proximity to said seal, said closing means being guided perpendicularly to the plane of the valve seat with a connection between said first arm and said closing means being designed such that the pivotal motion of said first arm results in a translatory motion of said closing means, said closing means includes a valve plunger guided in a longitudinally extending guide, a transverse recess is provided in said valve plunger for accommodating at least a portion of said first arm, said recess extending parallel to the plane of the valve seat, said transverse recess in the valve plunger forms a space which is closed on all sides with the exception of the opening for said first arm, and wherein said first arm is sealed and guided in said transverse recess of said valve plunger.

13. A valve arrangement as claimed in claim 12, wherein at least one of a throttle and check valve are provided for communicating said space with the outside.

14. A valve arrangement for aggressive fluids, the valve arrangement being equipped for servo-control by means of a pilot valve, the pilot valve including a shutter means cooperating with a pilot valve seat, the arrangement comprising: a plurality of plastic components including a valve body with inlet and outlet connections, a valve seat, a valve housing means, a closing means selectively movable toward and away from the valve seat for controlling the flow of the fluid, a two-armed lever pivotally mounted on an axle extending substantially parallel to the plane of the valve seat, a first arm of said two-armed lever extending substantially parallel to the plane of the valve seat and being operatively connected with said closing means, an actuating means upon the other arm of said two-armed lever, said first arm projecting through a movable seal with the pivot axis to said two-armed lever being arranged in proximity to said seal, said closing means being guided perpendicularly to the plane of the valve seat with a connection between said first arm and said closing means being designed such that the pivotal motion of said first arm results in a translatory motion of said closing means, said two-armed lever being formed as an angled lever with the other arm thereof extending substantially perpendicular to the plane of the valve seat, the losing means includes a valve plunger, the pilot valve seat is arranged in said valve plunger, the shutter means of the pilot valve being guided for sliding displacement with the valve plunger toward and away from the pilot valve seat, said first arm of said two-armed lever being operatively connected with the shutter means of the pilot valve for selectively displacing said shutter means within the valve plunger, and wherein a space between the valve plunger and the valve housing means is divided by a ring-type sealing diaphragm secured in a tightly sealing arrangement to the valve plunger and the valve housing means.

15. A valve arrangement as claimed in claim 14, wherein the edges of the ring-type sealing diaphragm in the region of the valve plunger and the valve housing are reinforced to form a ring having a circular cross-section, and wherein the diaphragm edges are supported in conforming grooves of circular cross-section and held in such a manner that they may be pivoted about their axes.

16. A valve arrangement as claimed in claim 15, wherein the sealing diaphragm is produced in a mold, especially by injection molding, the mold in the region of the circular-section edges of the sealing diaphragm being formed by the valve body and the valve plunger, respectively.

17. A valve arrangement as claimed in claim 16, wherein said sealing diaphragm consists of a material which will not combine with the material of the valve plunger nor the material of the valve housing.

18. A valve arrangement as claimed in claim 1, wherein said first arm is provided with a calotte-shaped projection intermediate the pivot axis of said two-armed lever means axle and the diaphragm bellows, the end portion of said bellows bears against said projection via an intermediate elastic member when yielding to internal excess pressure within a valve housing.

* * * * *